(12) United States Patent
Xu et al.

(10) Patent No.: US 12,099,673 B1
(45) Date of Patent: Sep. 24, 2024

(54) RECOGNITION SYSTEM FOR RECOGNIZING DUAL INPUTS OF GESTURES AND VIRTUAL KEYS ON TOUCH SCREEN

(71) Applicants: Kent Xu, Shenzhen (CN); Jianming Zhuang, Singapore (SG)

(72) Inventors: Kent Xu, Shenzhen (CN); Jianming Zhuang, Singapore (SG)

(73) Assignee: SUNIA PTE. LTD., Singapore (SG)

( * ) Notice: Subject to any disclaimer, the term of this patent is extended or adjusted under 35 U.S.C. 154(b) by 0 days.

(21) Appl. No.: 18/229,180

(22) Filed: Aug. 2, 2023

(51) Int. Cl.
| | |
|---|---|
| *G06F 3/041* | (2006.01) |
| *G06F 3/023* | (2006.01) |
| *G06F 40/232* | (2020.01) |

(52) U.S. Cl.
CPC .......... *G06F 3/0416* (2013.01); *G06F 3/0237* (2013.01); *G06F 40/232* (2020.01); *G06F 2203/04104* (2013.01)

(58) Field of Classification Search
None
See application file for complete search history.

(56) References Cited

U.S. PATENT DOCUMENTS

| | | | |
|---|---|---|---|
| 9,053,431 B1 * | 6/2015 | Commons | G10L 15/16 |
| 2023/0177878 A1 * | 6/2023 | Sekar | G06F 40/40 |
| | | | 382/103 |

* cited by examiner

*Primary Examiner* — Stephen T. Reed

(57) ABSTRACT

A recognition system for recognizing dual inputs of gestures and virtual keys on a touch screen includes a touch IC connected to the touch screen for receiving a plurality of touch signals generated by the touch screen and converting the touch signals to a touch data frame. A processor set is connected to the touch IC. The processor set serves to perform a touch data processing on the touch data frame from the touch IC. The touch data processing is performed by using a processing directly executed by an OS (Operating System) and a processing of AI (artificial intelligence) recognizing. The processor set serves to perform a grammar correction on a recognition result of the AI recognizing. A result of the grammar correction is output to the OS for processing.

7 Claims, 5 Drawing Sheets

RECOGNITION SYSTEM FOR RECOGNIZING DUAL INPUTS OF GESTURES AND VIRTUAL KEYS ON TOUCH SCREEN

FIELD OF THE INVENTION

The present invention is related to recognition of inputs of a touch screen, and in particular to a recognition system for recognizing dual inputs of gestures and virtual keys on a touch screen.

BACKGROUND OF THE INVENTION

Many electronic products use touch screens as input devices, which are widely used in various industries, such as computers, PADs, mobile phones, automobiles, medical equipment, industrial control equipment, etc. Gesture input or typing is performed on the touch screens. However, in the prior arts, the virtual keyboard on the touch screen has disadvantages that the virtual keyboard lacks the feeling of typing on an actual keyboard, and the position of the virtual keyboard is fixed and cannot be changed. Although some individual inventions provide a virtual keyboard with a special key arrangement, the user still needs to keep eyes on the virtual keyboard to touch the correct key, which decreases the input speed and is prone to produce input mistakes.

Generally, the input method of the touch screen is completely different from that of the actual keyboard. When the user inputs by using the touch screen, an input method is that the user touch the keys one by one on the virtual keyboard which is opened on the touch screen. Another input method is that the user uses gestures on the touch screen and the gestures are identified by the operating system (OS) for performing corresponding control operations on the entire mechanism installed with the touch screen. Most of the control operations are basic operations of an individual application (APP), which can only be performed one by one due to the limitation of cooperation of the traditional touch screen and the operating system. Therefore, the control operations cannot be performed like the continuous operations and multiple input operations on the keyboard.

Therefore, the present invention desires to provide a novel invention which can recognize both inputs of gestures and virtual keys. The present invention is capable of processing continuous and multiple inputs on the touch screen. When the number of the inputs is not supported by the operating system, the present invention provides AI (artificial intelligence) recognition for recognizing the inputs. As a result, the user can operate the touch screen as smooth and fast as using actual keys and the disadvantages on above prior arts are solved by the present invention.

SUMMARY OF THE INVENTION

Accordingly, for improving above mentioned defects in the prior art, the object of the present invention is to provide a recognition system for recognizing dual inputs of gestures and virtual keys on a touch screen, The advantages of the present invention are that the present invention is capable of pre-determining whether the gestures or virtual keyboard inputs on the touch screen are capable of directly processed by the operating system installed in the touch screen. When the gestures or virtual keyboard inputs are capable of directly processed by the operating system, related touch data of the gestures or virtual keyboard inputs are directly recognized and processed by the operating system. When the gestures or virtual keyboard inputs are not capable of directly processed by the operating system, related touch data of these complicated gestures or virtual keyboard inputs are predicted and recognized by using an AI (artificial intelligence) recognition module so that the recognizing result can be processed by the operating system. Therefore, the user can operate the touch screen as smooth and fast as using actual keys. The AI recognition module improves the accuracy of gestures and key inputs on the touch screen, as well as the response speed of touch input, which improves the user's input speed on the touch screen, and input operations on the touch screen are less prone to disoperation so that the user's operating experience is improved.

To achieve above object, the present invention provides A recognition system for recognizing dual inputs of gestures and virtual keys on a touch screen; the touch screen serving to receive a touch action of a user for generating a plurality of touch signals; and the touch signals being electronic signals formed by electrical changes of a plurality of pixels of the touch screen caused by the touch action; the recognition system comprising a touch IC connected to the touch screen; the touch IC serving to receive the touch signals from the touch screen and to convert the touch signals to a touch data frame which has a 2D (two-dimensional) structure formed by a plurality of touch data items; and each of the touch data items corresponding to an electrical change of a respective pixel of the touch screen caused by the touch action; a processor set connected to the touch IC and an OS (Operating System); the processor set serving to receive the touch data frame from the touch IC and to perform a touch data processing on the touch data frame; and the touch data processing being performed by using a processing directly executed by the OS and a processing of AI (artificial intelligence) recognizing; and wherein in the touch data processing, when the touch data frame corresponds to a plurality of first inputs and a number of the first inputs is less than a predetermined number, the touch data frame is viewed as a data frame which is capable of being directly processed by the OS and is output to the OS for processing; when the touch data frame corresponds to a plurality of second inputs and a number of the second inputs is larger than or equal to the predetermined number, the touch data frame is viewed as a data frame which is not capable of being directly processed by the OS and is output to a AI (artificial intelligence) recognition module for the AI recognizing of the touch data frame; the processor set receives a recognition result of the AI recognizing of the touch data frame from the AI recognition module and performs a grammar correction on the recognition result; and a result of the grammar correction on the recognition result is output to the OS for processing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 5, a recognition system for recognizing dual inputs of gestures and virtual keys on a touch screen 27 of the present invention is illustrated. The recognition system includes the following elements.

The touch screen 27 serves to receive a touch action of a user for generating a plurality of touch signals. The touch signals are electronic signals formed by electrical changes of a plurality of pixels of the touch screen 27 caused by the touch action. The touch screen 27 is a touch panel of an electronic device, such as a touch panel of a mobile phone or a tablet.

Figure 4:
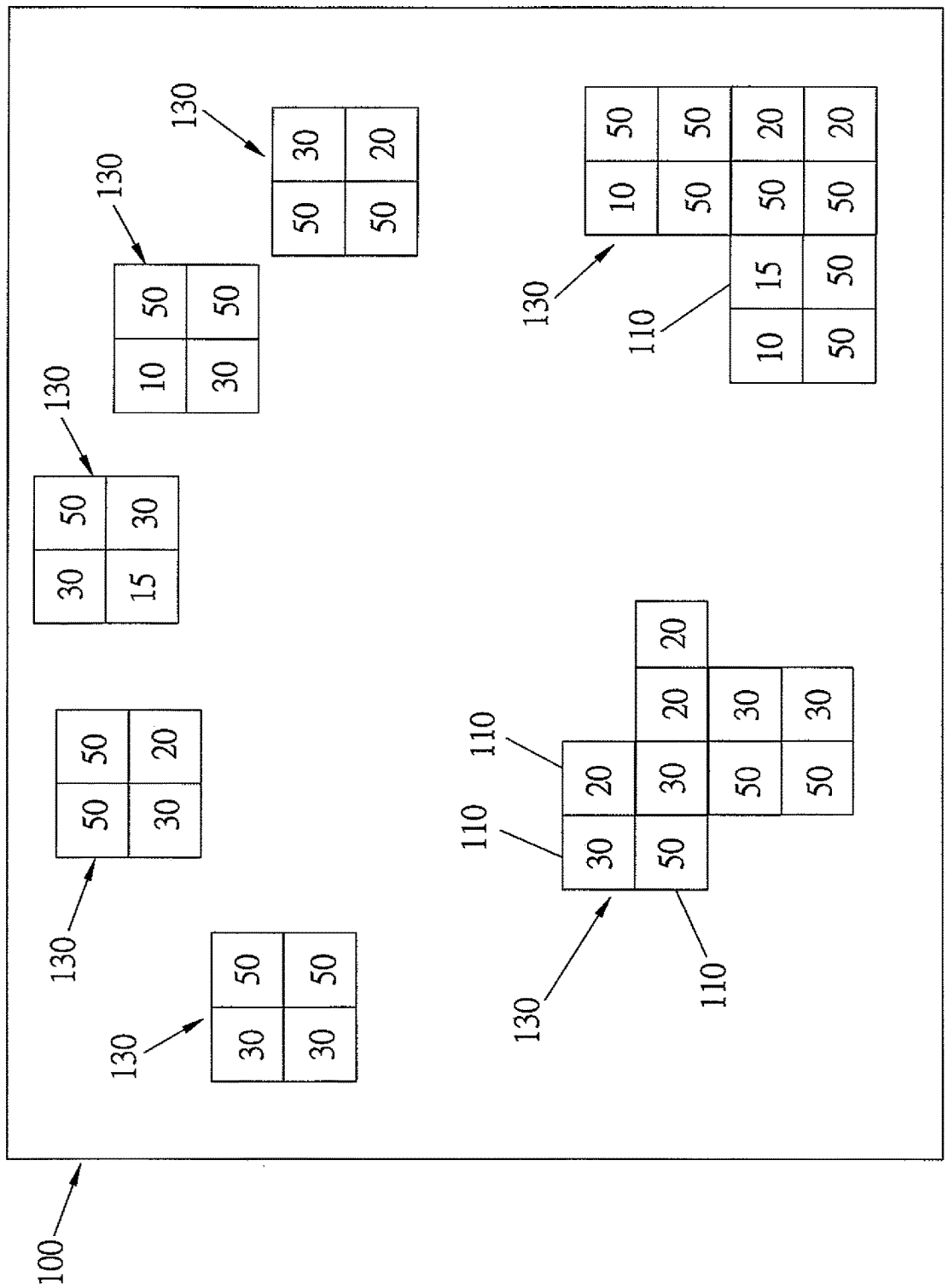
FIG. 4 is a schematic view showing the touch data frame of the present invention.

A touch IC 26 is connected to the touch screen 27. The touch IC 26 serves to receive the touch signals from the touch screen 27 and to convert the touch signals to a touch data frame 100 which has a 2D (two-dimensional) structure formed by a plurality of touch data items 110. Each of the touch data items 110 corresponds to an electrical change (such as capacitance change) of a respective pixel of the touch screen 27 caused by the touch action. The capacitance of the pixel which is not located at a position touched by the touch action will be not changed, while the capacitance of the pixel located at a position touched by the touch action will be changed. Referring to FIG. 4, the touch data items 110 are distributed on at least one position of the touch data frame 100 and positions located the touch data items 110 of the touch data frame 100 correspond to positions touched by the touch action on the touch screen 27. In FIG. 4, a value of each of the touch data items 110 represents a touch pressure applied by the touch action on the touch screen 27. A larger value of the touch data item 110 means a larger touch pressure. Therefore, the value of the touch data item 110 and the position located the touch data item 110 in the touch data frame 100 represent a respective touch pressure and touched position on the touch screen 27.

A processor set 25 is connected to the touch IC 26 and an OS (Operating System) 22. The processor set 25 serves to receive the touch data frame 100 from the touch IC 26 and to perform a touch data processing on the touch data frame 100. The touch data processing is performed by using a processing directly executed by the OS 22 and a processing of AI (artificial intelligence) recognizing.

In the touch data processing, when the touch data frame 100 corresponds to a plurality of first inputs and a number of the first inputs is less than a predetermined number, the touch data frame 100 is viewed as a data frame which is capable of being directly processed by the OS 22 and is output to the OS 22 for processing. When the touch data frame 100 corresponds to a plurality of second inputs and a number of the second inputs is larger than or equal to the predetermined number, the touch data frame 100 is viewed as a data frame which is not capable of being directly processed by the OS 22 and is output to a AI (artificial intelligence) recognition module 200 for the AI recognizing of the touch data frame 100. The processor set 25 serves to receive a recognition result of the AI recognizing of the touch data frame 100 from the AI recognition module 200 and to perform a grammar correction on the recognition result. A result of the grammar correction on the recognition result is output to the OS 22 for processing.

When the processing of the OS 22 is completed, the OS 22 outputs related data to a respective application 21 connected to the OS 22.

Figure 1:
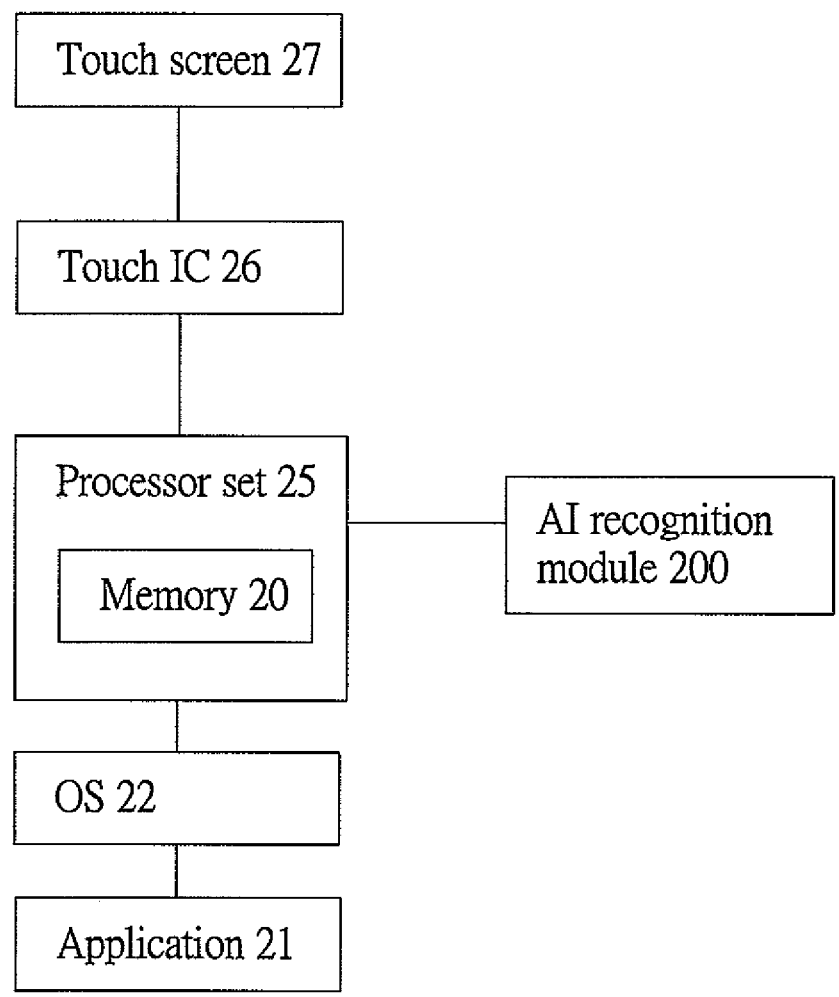
FIG. 1 is a structured block diagram showing main elements of the present invention.
Figure 2:
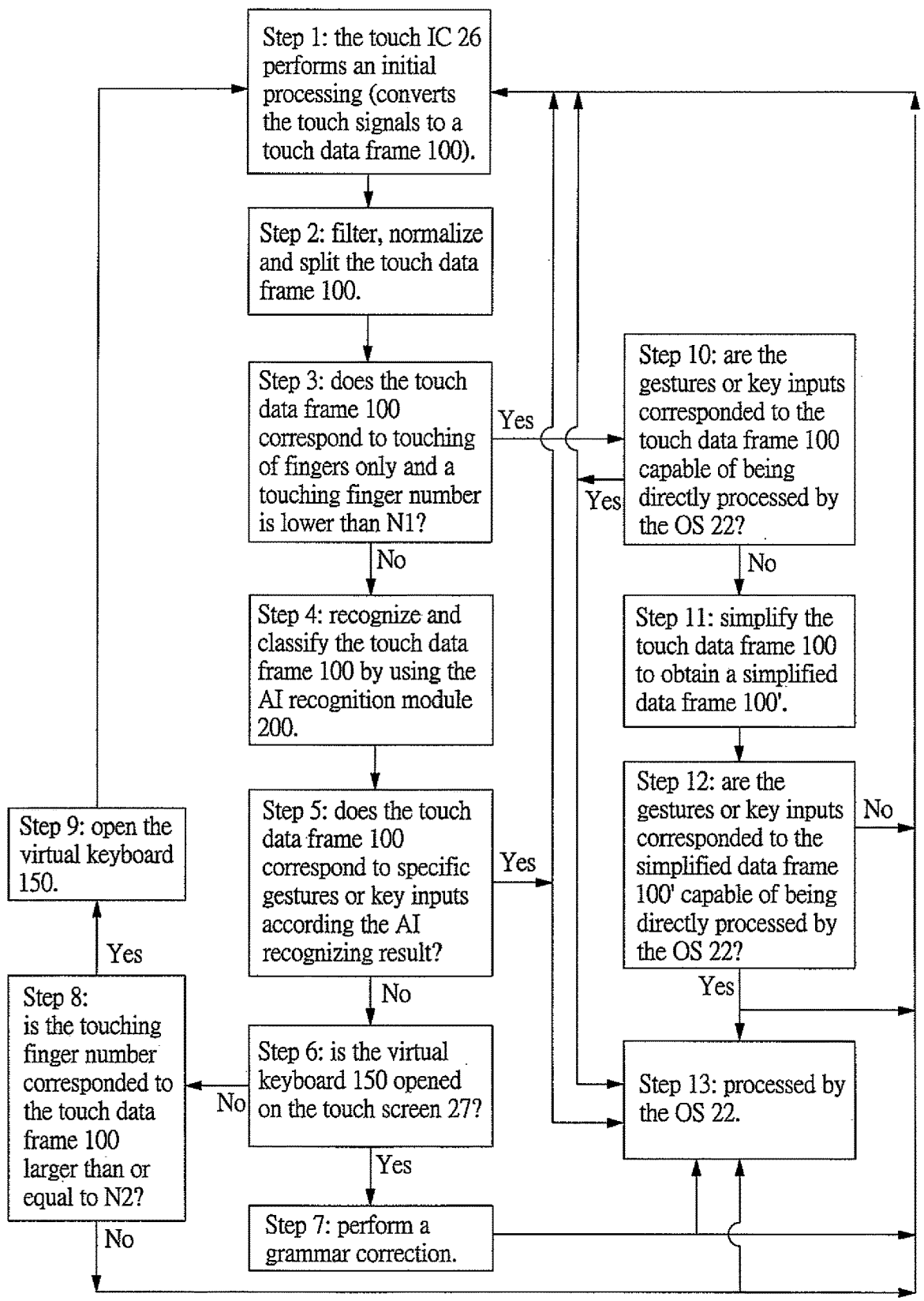
FIG. 2 is a steps flow diagram showing steps of operations of the touch data processing of the present invention.
Figure 3:
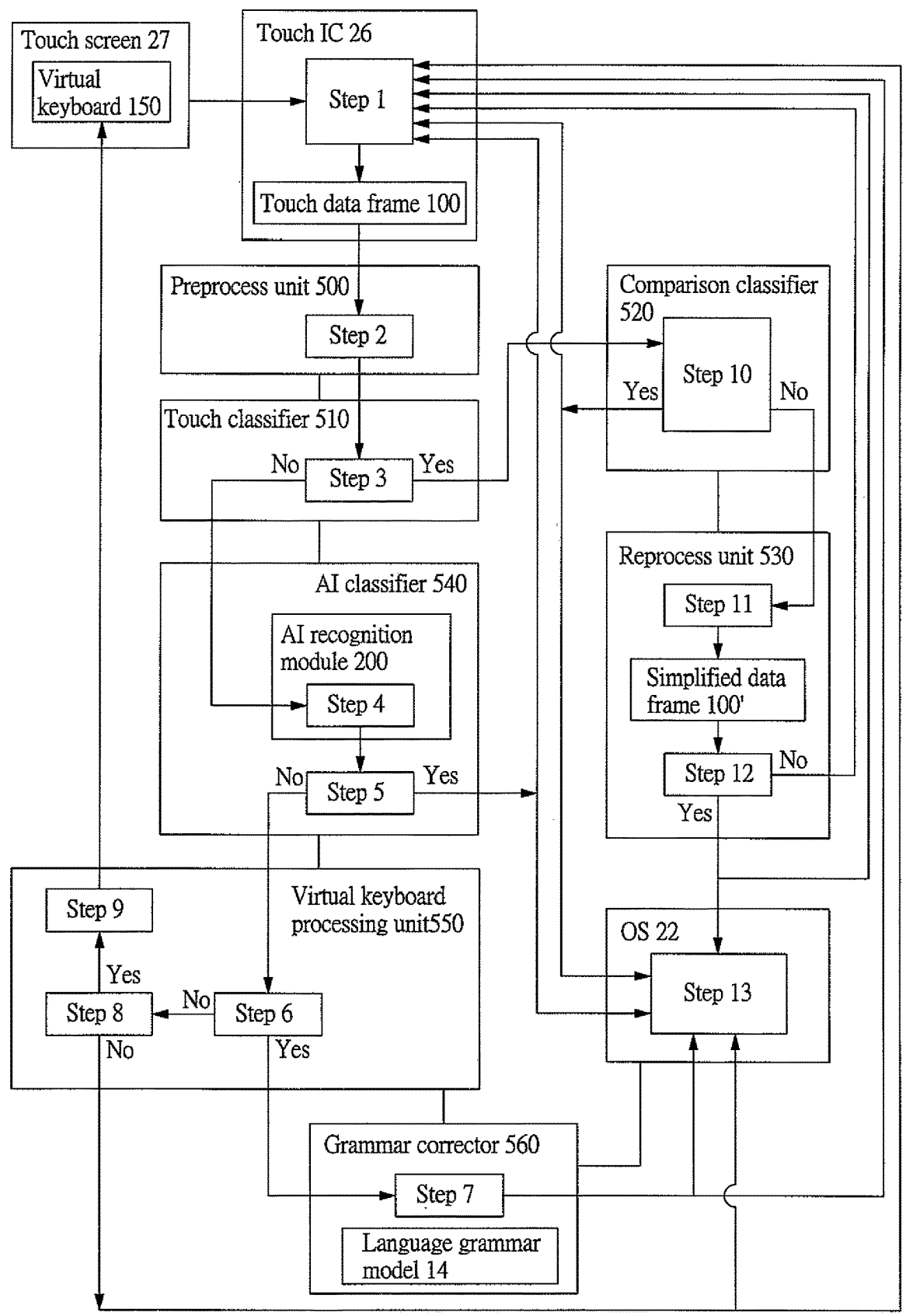
FIG. 3 is a structured block diagram showing partial elements of the present invention.

FIGS. 2 and 3 show the steps and structured blocks related to the touch data processing of the processor set 25. The touch data processing is performed by using the touch IC 26, a preprocess unit 500, a touch classifier 510, a comparison classifier 520, a reprocess unit 530, an AI (artificial intelligence) classifier 540, a virtual keyboard processing unit 550 and a grammar corrector 560.

The touch IC 26 serves to perform an initial processing. The initial processing is that the touch IC 26 receives the touch signals from the touch screen 27 and converts the touch signals to the touch data frame 100 (step 1).

The preprocess unit 500 is connected to the touch IC 26. The preprocess unit 500 serves to receive the touch data frame 100 and to perform a noise filtering on the touch data items 110 of the touch data frame 100 to remove unnecessary noises in the touch data frame 100. Values of the touch data items 110 of the touch data frame 100 which is filtered are normalized by using a normalization to be limited in a predefined range. The touch data items 110 are split into a plurality of blocks 130 according to a distribution density of the touch data items 110. Each of the blocks 130 is composed of at least one respective touch data item 110 and is viewed as a single touched place touched by a single external object (such as a single finger of the user) which is used in the touch action (step 2). The blocks 130 may correspond to several single touched places on the touch screen 27 touched by several single parts of the hand, such as fingers or palms. The touch data items 110 are stored in a memory 20 of the processor set 25.

Figure 5:
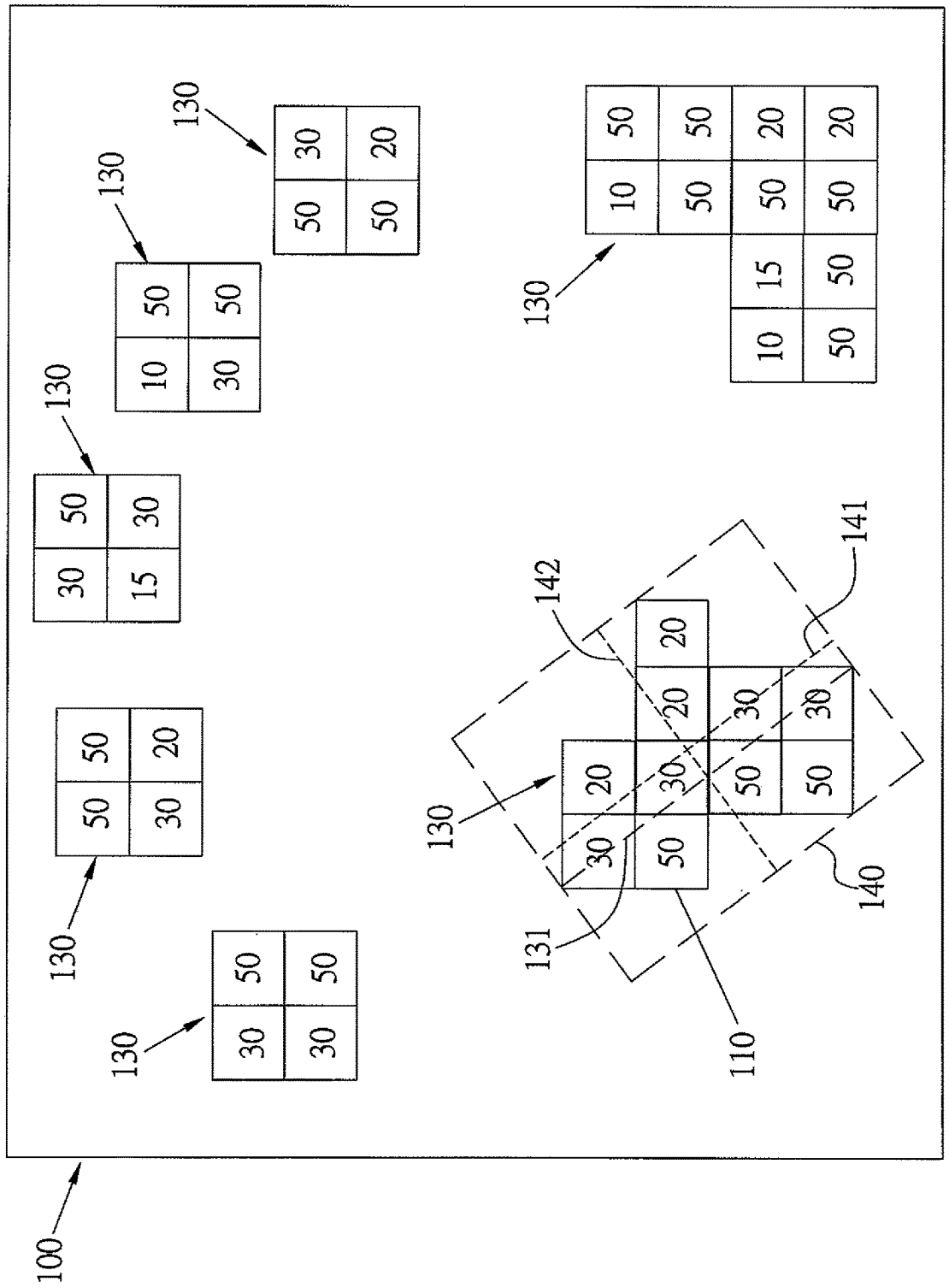
FIG. 5 is another schematic view showing the touch data frame and the minimum rectangle of the block.

Referring to FIGS. 4 and 5, a position of each of the blocks 130 is recorded in a form of vectors. The preprocess unit 500 serves for calculating a longer axis 141 and a shorter axis 142 of each of the blocks 130. In the calculating of the longer axis and the shorter axis, a minimum rectangle 140 covering a respective block 130 is calculated on a condition that a base line 131 connecting two points farthest apart in the respective block 130 is used to generate one of four sides of the minimum rectangle 140. The minimum rectangle 140 has two lines of symmetry which are perpendicular to two opposite sides of the four sides of the minimum rectangle 140 and to the other two opposite sides of the four sides of the minimum rectangle 140, respectively. The two lines of symmetry are used as the longer axis 141 and the shorter axis 142 of the respective block 130. The preprocess unit 500 is capable of calculating on multiple blocks 130.

The touch classifier 510 is connected to the preprocess unit 500. The touch classifier 510 serves to determine whether the touch data frame 100 corresponds to an input action performed by touching of the user's fingers only and a touching finger number corresponded to the touch data frame 100 is less than N1 (such as 5) (step 3). The touching finger number is a number of fingers corresponded to the input action. Related calculations required in above determination are known in the prior arts.

The comparison classifier 520 is connected to the touch classifier 510. When the touching finger number in the touch classifier 510 is less than N1, the touch classifier 510 outputs the touch data frame 100 to the comparison classifier 520. The comparison classifier 520 serves to determine whether gestures or key inputs corresponded to the touch data frame 100 are capable of being directly processed by the OS 22. When the gestures or key inputs corresponded to the touch data frame 100 are capable of being directly processed by the OS 22, the touch data items 110 of the touch data frame 100 are output to the OS 22 for processing (step 13) and the touch IC 26 is controlled to perform the initial processing (step 1) again for processing a next touch data frame 100.

The reprocess unit 530 is connected to the comparison classifier 520. In the comparison classifier 520, when the gestures or key inputs corresponded to the touch data frame 100 are not capable of being directly processed by the OS 22, the comparison classifier 520 outputs the touch data frame 100 to the reprocess unit 530. In the reprocess unit 530, the touch data frame 100 is simplified to form a simplified data frame 100' (step 11) by removing unnecessary touch data items 110 (such as that some of the touch data items 110 are jitter noise). The reprocess unit 530 determines whether gestures or key inputs corresponded to the simplified data frame 100' are capable of being directly processed by the OS 22 (step 12). When the gestures or key inputs corresponded to the simplified data frame 100' are capable of being directly processed by the OS 22, the simplified data frame 100' is output to the OS 22 for processing (step 13) and the touch IC 26 is controlled to perform the initial processing (step 1) again for processing a next touch data frame 100. When the gestures or key inputs corresponded to the simplified data frame 100' are not capable of being directly processed by the OS 22, the simplified data frame 100' is corresponded to a wrong operation and the touch IC 26 is controlled to perform the initial processing (step 1) again for processing a next touch data frame 100.

The AI classifier 540 is connected to the touch classifier 510. In the touch classifier 510 (step 3), when the touching finger number is larger than or equal to N1, the touch classifier 510 outputs the touch data frame 100 to the AI classifier 540 for classifying the touch data frame 100 (step 4).

In the classifying of the touch data frame 100 (step 4), the touch data frame 100 is input into the AI recognition module 200 located in the AI classifier 540 for recognizing the touch data frame 100 and the AI recognition module 200 outputs an AI recognizing result. The AI recognizing result is added to the touch data frame 100 for determining whether the touch data frame 100 corresponds to specific gestures or key inputs.

The AI recognition module 200 is a recognition module trained and tested with training and testing data. In training and testing of the AI recognition module 200, a plurality of training and testing touch data items captured from a single user and various users are used as inputs of the AI recognition module 200, and gestures or key inputs corresponded to the training and testing touch data items are used as expected outputs of the AI recognition module 200. The AI recognition module 200 is trained and tested by the inputs and outputs to obtain a function of recognizing the touch data items 110, that is, the AI recognition module 200 is capable of recognizing gestures or key inputs corresponded to the touch data items 110. The AI recognition module 200 may be a neural network module.

The AI classifier 540 determines whether the touch data frame 100 corresponds to specific gestures or key inputs according to the AI recognizing result of the AI recognition module 200 (step 5). When the touch data frame 100 corresponds to the specific gestures or key inputs according to the AI recognizing result, the AI classifier 540 outputs the touch data frame 100 including the AI recognizing result to the OS 22 for processing and the touch IC 26 is controlled to perform the initial processing (step 1) again for processing a next touch data frame 100.

The virtual keyboard processing unit 550 is connected to the AI classifier 540. In the AI classifier 540, when the touch data frame 100 does not corresponds to the specific gestures or key inputs according to the AI recognizing result (step 5), the AI classifier 540 outputs the touch data frame 100 including the AI recognizing result to the virtual keyboard processing unit 550 and the AI recognizing result is used as a sequence of input results from a virtual keyboard 150 touched by the user on the touch screen 27. The virtual keyboard processing unit 550 determines whether the virtual keyboard 150 is opened on the touch screen 27 at a same time when the touch data frame 100 is generated by the touch IC 26 (step 6).

The grammar corrector 560 is connected to the virtual keyboard processing unit 550 and includes a pre-trained language grammar model 14. In the virtual keyboard processing unit 550, when the virtual keyboard 150 is opened on the touch screen 27 at the same time when the touch data frame 100 is generated by the touch IC 26, the virtual keyboard processing unit 550 outputs the AI recognizing result to the grammar corrector 560 for a grammar correction (step 7). The grammar correction is performed by using the language grammar model 14 which predicts and corrects a grammar of the AI recognizing result for improving an input accuracy and an input speed.

The language grammar model 14 is an AI grammar model which includes a plurality of pre-established grammar rules. The grammar rules represent a plurality of correct legal inputs of the virtual keyboard 150, and a plurality of correction rules. The correction rules are used to correct errors caused by wrong keys touched by the user, and to correct errors caused by recognizing of the AI recognition module 200. The AI recognizing result is corrected by the grammar rules.

The AI recognizing result corrected by the grammar corrector 560 forms a HID (human inter device) information (which represents the sequence of the input results from the virtual keyboard 150). The AI recognizing result corrected by the grammar corrector 560 is output to the OS 22 for processing and the touch IC 26 is controlled to perform the initial processing (step 1) again for processing a next touch data frame 100.

In the virtual keyboard processing unit 550, when the virtual keyboard 150 is not opened on the touch screen 27 at the same time when the touch data frame 100 is generated by the touch IC 26 (step 6), the virtual keyboard processing unit 550 determines whether the touching finger number corresponded to the touch data frame 100 including the AI recognizing result is larger than or equal to N2. When the touching finger number corresponded to the touch data frame 100 including the AI recognizing result is larger than or equal to N2, the virtual keyboard processing unit 550 generates the virtual keyboard 150 suitable for sizes of the user's hands and opens the virtual keyboard 150 at a place touched by the user's fingers on the touch screen 27, and the touch IC 26 is controlled to perform the initial processing (step 1) again for processing a next touch data frame 100 which corresponds to finger touching operations on the virtual keyboard 150. When the touching finger number corresponded to the touch data frame 100 including the AI recognizing result is less than N2, the virtual keyboard processing unit 550 outputs the touch data frame 100 including the AI recognizing result to the OS 22 for processing and the touch IC 26 is controlled to perform the initial processing (step 1) again for processing a next touch data frame 100.

The present invention performs a processing of AI recognizing on the touch data frame 100 to achieve correct operations on related applications. By using the processing of AI recognizing, the touch data items 110 of the touch data frame 100 from a touch device can be recognized as touching of the user's fingers or palms, or other touch actions not required for operating (such as that the user's hands are just placed on the touch device and do not have any input action). The present invention is capable of fitting various operating conditions of the user by using AI learning in the training and testing of the AI recognition module 200.

The advantages of the present invention are that the present invention is capable of pre-determining whether the gestures or virtual keyboard inputs on the touch screen are capable of directly processed by the operating system installed in the touch screen. When the gestures or virtual keyboard inputs are capable of directly processed by the operating system, related touch data of the gestures or virtual keyboard inputs are directly recognized and processed by the operating system. When the gestures or virtual keyboard inputs are not capable of directly processed by the operating system, related touch data of these complicated gestures or virtual keyboard inputs are predicted and recognized by using an AI recognition module so that the recognizing result can be processed by the operating system. Therefore, the user can operate the touch screen as smooth and fast as using actual keys. The AI recognition module improves the accuracy of gestures and key inputs on the touch screen, as well as the response speed of touch input, which improves the user's input speed on the touch screen, and input operations on the touch screen are less prone to disoperation so that the user's operating experience is improved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recognition system for recognizing dual inputs of gestures and virtual keys on a touch screen; the touch screen serving to receive a touch action of a user for generating a plurality of touch signals; the touch signals being electronic signals formed by electrical changes of a plurality of pixels of the touch screen caused by the touch action; the recognition system comprising:

a touch IC connected to the touch screen; the touch IC serving to receive the touch signals from the touch screen and to convert the touch signals to a touch data frame which has a 2D (two-dimensional) structure formed by a plurality of touch data items; and each of the touch data items corresponding to an electrical change of a respective pixel of the touch screen caused by the touch action;

a processor set connected to the touch IC and an OS (Operating System); the processor set serving to receive the touch data frame from the touch IC and to perform a touch data processing on the touch data frame; and the touch data processing being performed by using a processing directly executed by the OS and a processing of AI (artificial intelligence) recognizing; and wherein in the touch data processing, when the touch data frame corresponds to a plurality of first inputs and a number of the first inputs is less than a predetermined number, the touch data frame is viewed as a data frame which is capable of being directly processed by the OS and is output to the OS for processing; when the touch data frame corresponds to a plurality of second inputs and a number of the second inputs is larger than or equal to the predetermined number, the touch data frame is viewed as a data frame which is not capable of being directly processed by the OS and is output to a AI (artificial intelligence) recognition module for the AI recognizing of the touch data frame; the processor set serves to receive a recognition result of the AI recognizing of the touch data frame from the AI recognition module and to perform a grammar correction on the recognition result; and a result of the grammar correction on the recognition result is output to the OS for processing.

2. The recognition system for recognizing the dual inputs of the gestures and the virtual keys on the touch screen as claimed in claim 1, wherein the touch screen is a touch panel of an electronic device.

3. The recognition system for recognizing the dual inputs of the gestures and the virtual keys on the touch screen as claimed in claim 1, wherein the touch data processing is performed by using the touch IC, a preprocess unit, a touch classifier, a comparison classifier, a reprocess unit, an AI (artificial intelligence) classifier, a virtual keyboard processing unit and a grammar corrector;

wherein the touch IC serves to perform an initial processing; the initial processing is that the touch IC receives the touch signals from the touch screen and converts the touch signals to the touch data frame;

wherein the preprocess unit is connected to the touch IC; the preprocess unit serves to receive the touch data frame and to perform a noise filtering on the touch data items of the touch data frame to remove unnecessary noises in the touch data frame; values of the touch data items of the touch data frame which is filtered are normalized by using a normalization to be limited in a predefined range; the touch data items are split into a plurality of blocks according to a distribution density of the touch data items; each of the blocks is composed of at least one respective touch data item and is viewed as a single touched place touched by a single external object which is used in the touch action; a position of each of the blocks is recorded in a form of vectors; the preprocess unit serves for calculating a longer axis and a shorter axis of each of the blocks; the preprocess unit is capable of calculating on multiple blocks;

wherein the touch classifier is connected to the preprocess unit; the touch classifier serves to determine whether the touch data frame corresponds to an input action performed by touching of the user's fingers only and a touching finger number corresponded to the touch data frame is less than N1; the touching finger number is a number of fingers corresponded to the input action;

wherein the comparison classifier is connected to the touch classifier; when the touching finger number in the touch classifier is less than N1, the touch classifier outputs the touch data frame to the comparison classifier; the comparison classifier serves to determine whether gestures or key inputs corresponded to the touch data frame are capable of being directly processed by the OS; when the gestures or key inputs corresponded to the touch data frame are capable of being directly processed by the OS, the touch data items of the touch data frame are output to the OS for processing and the touch IC is controlled to perform the initial processing again for processing a next touch data frame;

wherein the reprocess unit is connected to the comparison classifier; in the comparison classifier, when the gestures or key inputs corresponded to the touch data frame are not capable of being directly processed by the OS, the comparison classifier outputs the touch data frame to the reprocess unit; in the reprocess unit, the touch data frame is simplified to form a simplified data frame by removing unnecessary touch data items; the reprocess unit determines whether gestures or key inputs corresponded to the simplified data frame are capable of being directly processed by the OS; when the gestures or key inputs corresponded to the simplified data frame are capable of being directly processed by the OS, the simplified data frame is output to the OS for processing and the touch IC is controlled to perform the initial processing again for processing a next touch data frame; when the gestures or key inputs corresponded to the simplified data frame are not capable of being directly processed by the OS, the simplified data frame is corresponded to a wrong operation and the touch IC is controlled to perform the initial processing again for processing a next touch data frame;

wherein the AI classifier is connected to the touch classifier; in the touch classifier, when the touching finger number is larger than or equal to N1, the touch classifier outputs the touch data frame to the AI classifier for classifying the touch data frame; in the classifying of the touch data frame, the touch data frame is input into the AI recognition module located in the AI classifier for recognizing the touch data frame and the AI recognition module outputs an AI recognizing result; the AI recognizing result is added to the touch data frame for determining whether the touch data frame corresponds to specific gestures or key inputs; the AI classifier determines whether the touch data frame corresponds to specific gestures or key inputs according to the AI recognizing result of the AI recognition module; when the touch data frame corresponds to the specific gestures or key inputs according to the AI recognizing result, the AI classifier outputs the touch data frame including the AI recognizing result to the OS for processing and the touch IC is controlled to perform the initial processing again for processing a next touch data frame;

wherein the virtual keyboard processing unit is connected to the AI classifier; in the AI classifier, when the touch data frame does not corresponds to the specific gestures or key inputs according to the AI recognizing result, the AI classifier outputs the touch data frame including the AI recognizing result to the virtual keyboard processing unit and the AI recognizing result is used as a sequence of input results from a virtual keyboard touched by the user on the touch screen; the virtual keyboard processing unit determines whether the virtual keyboard is opened on the touch screen at a same time when the touch data frame is generated by the touch IC;

wherein the grammar corrector is connected to the virtual keyboard processing unit and includes a pre-trained language grammar model; in the virtual keyboard processing unit, when the virtual keyboard is opened on the touch screen at the same time when the touch data frame is generated by the touch IC, the virtual keyboard processing unit outputs the AI recognizing result to the grammar corrector for a grammar correction; the grammar correction is performed by using the language grammar model which predicts and corrects a grammar of the AI recognizing result; the AI recognizing result corrected by the grammar corrector is output to the OS for processing and the touch IC is controlled to perform the initial processing again for processing a next touch data frame;

wherein in the virtual keyboard processing unit, when the virtual keyboard is not opened on the touch screen at the same time when the touch data frame is generated by the touch IC, the virtual keyboard processing unit determines whether the touching finger number corresponded to the touch data frame including the AI recognizing result is larger than or equal to N2; when the touching finger number corresponded to the touch data frame including the AI recognizing result is larger than or equal to N2, the virtual keyboard processing unit generates the virtual keyboard suitable for sizes of the user's hands and opens the virtual keyboard at a place touched by the user's fingers on the touch screen, and the touch IC is controlled to perform the initial processing again for processing a next touch data frame which corresponds to finger touching operations on the virtual keyboard; when the touching finger number corresponded to the touch data frame including the AI recognizing result is less than N2, the virtual keyboard processing unit outputs the touch data frame including the AI recognizing result to the OS for processing and the touch IC is controlled to perform the initial processing again for processing a next touch data frame.

4. The recognition system for recognizing the dual inputs of the gestures and the virtual keys on the touch screen as claimed in claim 1, wherein the AI recognition module is a recognition module trained and tested with training and testing data; in training and testing of the AI recognition module, a plurality of training and testing touch data items captured from a single user and various users are used as inputs of the AI recognition module, and gestures or key inputs corresponded to the training and testing touch data items are used as expected outputs of the AI recognition module; the AI recognition module is trained and tested by the inputs and outputs to obtain a function of recognizing the touch data items, that is, the AI recognition module is capable of recognizing gestures or key inputs corresponded to the touch data items.

5. The recognition system for recognizing the dual inputs of the gestures and the virtual keys on the touch screen as claimed in claim 3, wherein the AI recognition module is a recognition module trained and tested with training and testing data; in training and testing of the AI recognition module, a plurality of training and testing touch data items captured from a single user and various users are used as inputs of the AI recognition module, and gestures or key inputs corresponded to the training and testing touch data items are used as expected outputs of the AI recognition module; the AI recognition module is trained and tested by the inputs and outputs to obtain a function of recognizing the touch data items, that is, the AI recognition module is capable of recognizing gestures or key inputs corresponded to the touch data items.

6. The recognition system for recognizing the dual inputs of the gestures and the virtual keys on the touch screen as claimed in claim 4, wherein the AI recognition module is a neural network module.

7. The recognition system for recognizing the dual inputs of the gestures and the virtual keys on the touch screen as claimed in claim 3, wherein the language grammar model is an AI grammar model which includes a plurality of pre-established grammar rules; the grammar rules represent a plurality of correct legal inputs of the virtual keyboard, and a plurality of correction rules; the correction rules are used to correct errors caused by wrong keys touched by the user, and to correct errors caused by recognizing of the AI recognition module; the AI recognizing result is corrected by the grammar rules.

* * * * *